United States Patent Office 3,031,318
Patented Apr. 24, 1962

3,031,318
LOW THERMAL EXPANSION GLASS
Bhogaraju V. Janakirama-Rao, Philadelphia, Pa., assignor to International Resistance Company, Philadelphia, Pa.
No Drawing. Filed July 12, 1960, Ser. No. 42,203
4 Claims. (Cl. 106—52)

The present invention relates to a low thermal expansion glass, and more particularly to a glass having a thermal coefficient of linear expansion of substantially zero.

It has often been found desirable to have a glass which is transparent, and which will not expand or contract when subjected to a change in temperature. Such a glass would have utility as a window in a high temperature test chamber, or as a window for a furnace. In the field of rocketry and space photography, such a glass would have utility as a window or lens which could withstand the violent changes in temperature through which a rocket passes.

Most transparent glasses have silica as their major ingredient. Many other elements are added to the silica in various amounts to vary the properties of the glass. Fused silica has a thermal coefficient of linear expansion of 5 to $8 \times 10^{-7}$ per ° C. in the range of 20° C. to 600° C. The addition of most other ingredients either does not affect the coefficient of expansion of the fused silica or increases the coefficient of expansion.

It is an object of the present invention to provide a novel glass.

It is another object of the present invention to provide a glass which has a thermal coefficient of linear expansion less than that of fused silica.

It is a further object of the present invention to provide a glass having a thermal coefficient of linear expansion of substantially zero in the range of 20° C. to 600° C.

Other objects will appear hereinafter.

The invention accordingly comprises a composition of matter possessing the characteristics, properties, and the relation of components which will be exemplified in the composition hereinafter described, and the scope of the invention will be indicated in the claims.

I have found that when a small amount, not more than 5 percent by weight, of either niobium oxide ($Nb_2O_5$) or tantalum oxide ($Ta_2O_5$), or a combination of niobium oxide and tantalum oxide is fused together with silica ($SiO_2$), a glass is formed which has a thermal coefficient of linear expansion of approximately zero in the range of 60° C. to 600° C. In addition, the glass so formed is transparent and has a high melting temperature, approximately 1760° C., so that it will withstand high temperatures. Thus, the glass of the present invention comprises a major portion of silica, and a small portion of either niobium oxide, or tantalum oxide, or a combination of niobium oxide and tantalum oxide. The silica is present in the glass in the amount of 95% to 99.9% by weight, and the niobium oxide and/or tantalum oxide is present in the amount of 0.1% to 5% by weight.

The glass of the present invention has been formed by mixing a batch of commercial silica sand and either niobium oxide, or tantalum oxide, or a mixture of niobium oxide and tantalum oxide in the proper proportions in a crucible which will withstand high temperatures, such as a stabilized zirconia crucible. The crucible and its contents were heated to a temperature of approximately 1760° C. to melt the mixture of the silica and the niobium oxide and/or tantalum oxide. The crucible and its contents were maintained at the melting temperature of 1760° C. for a period sufficient to insure complete melting and fusion of the contents. The crucible and the fused glass of the present invention was then cooled at the rate of approximately 200° C. per hour until the glass reached room temperature. As the fused glass was cooled, the glass solidified in the crucible. By cooling the glass slowly, the glass was rough annealed to prevent excessive strains in the glass. When the glass reached room temperature, a piece of the glass was cut from the crucible. The glass of the present invention can be made by other well known techniques for making high temperature materials, such as aluminum oxide, such as by the Verneuil technique.

The present invention may be embodied in other specific forms without departing from the spirit or essential attributes thereof and, accordingly, reference should be made to the appended claims, rather than to the foregoing specification as indicating the scope of the invention.

I claim:

1. A glass having a thermal coefficient of linear expansion of less than that of fused silica and approximately zero in the range of 60° C. to 600° C. consisting essentially of by weight 95% to 99.9% silica, and 0.1% to 5% of an oxide selected from the group consisting of niobium oxide, tantalum oxide, and a mixture of niobium oxide and tantalum oxide.

2. A glass having a thermal coefficient of linear expansion of less than that of fused silica and approximately zero in the range of 60° C. to 600° C. consisting essentially of by weight 95% to 99.9% silica, and 0.1% to 5% niobium oxide.

3. A glass having a thermal coefficient of linear expansion of less than that of fused silica and approximately zero in the range of 60° C. to 600° C. consisting essentially of by weight 95% to 99.9% silica, and 0.1% to 5% tantalum oxide.

4. A glass having a thermal coefficient of linear expansion of less than that of fused silica and approximately zero in the range of 60° C. to 600° C. consisting essentially of by weight 95% to 99.9% silica, and 0.1% to 5% of a mixture of niobium oxide and tantalum oxide.

References Cited in the file of this patent
UNITED STATES PATENTS

| | | |
|---|---|---|
| 2,152,994 | Hanlein | Apr. 4, 1939 |
| 2,219,331 | Pirani | Oct. 29, 1940 |
| 2,219,332 | Pirani | Oct. 29, 1940 |